INVENTOR
JOSE GINER

BY *Finnegan & Henderson*
ATTORNEYS

INVENTOR
JOSE GINER

BY *Finnegan & Henderson*

ATTORNEYS

July 7, 1970  J. GINER  3,519,488
CARBON DIOXIDE ABSORBER MEANS AND FUEL CELL
TO REGENERATE ABSORBENT
Original Filed March 30, 1967  3 Sheets-Sheet 3

INVENTOR
JOSE GINER

BY *Finnegan & Henderson*

ATTORNEYS

United States Patent Office 3,519,488
Patented July 7, 1970

3,519,488
CARBON DIOXIDE ABSORBER MEANS AND FUEL CELL TO REGENERATE ABSORBENT
Jose Giner, Sudbury, Mass., assignor to United Aircraft Corporation, East Hartford, Conn., a corporation of Delaware
Original application Mar. 30, 1967, Ser. No. 627,119. Divided and this application Mar. 21, 1969, Ser. No. 833,220
Int. Cl. H01m 27/14
U.S. Cl. 136—86                                   20 Claims

ABSTRACT OF THE DISCLOSURE

A process and system are provided for scrubbing $CO_2$ from gas streams and regenerating the scrubbing medium. The scrubbing medium is an alkaline solution, preferably of an alkali metal hydroxide. The regeneration is effected by one or more regenerating fuel cells which utilize spent scrubber solution as an electrolyte. Hydroxyl ions are consumed at the cell anode, and produced at the cell cathode, and positive alkali metal ions migrate from the anolyte to the catholyte to preserve the electroneutrality of the cell. The pH of the anolyte solution is thereby reduced to about 0, and $CO_2$ gas is evolved, regenerating the solution. The regenerating cell preferably contains a barrier spaced between the anode and cathode to prevent back diffusion of alkali metal hydroxide from the catholyte to the anolyte. The barrier can be a porous diaphragm, but is preferably a cation permeable membrane.

This application is a division of application Ser. No. 627,119, filed Mar. 30, 1967.

This invention relates to the removal of carbon dioxide from gas streams. More particularly, it relates to a process for removing carbon dioxide ($CO_2$) from gas streams by absorption, which includes the periodic regeneration of the carbon dioxide absorber to prepare it for additional absorption; and to regenerable carbon dioxide absorption systems used in this process.

It is greatly beneficial to remove carbon dioxide from many gas streams, such as from influent gas streams to fuel cells, from the air supply systems of submarines, and the like.

A particularly important use for $CO_2$ absorbers is in the purification of influent gas streams to fuel cells. Fuel cell electrolytes are frequently materials which are reactive with carbon dioxide. For example, potassium hydroxide (KOH) and sodium hydroxide (NaOH) are often used as electrolytes, and both of these materials react avidly with $CO_2$. Thus, if $CO_2$ is allowed to enter the cell, it can react with the electrolyte to form a precipitate which accumulates at the surfaces of the porous electrodes of the cell and reduces the efficiency and performance of the cell.

The process and $CO_2$ absorber system of this invention are particularly useful in scrubbing either the oxidizing gas (generally, oxygen or air) supplied to the cathode of a fuel cell, the fuel gas (generally, hydrogen) supplied to the anode of a cell, or both.

Various methods and systems have been proposed in the prior art for the removal of $CO_2$ from gas streams. Absorbents of the soda-lime class have been used for this purpose, but these absorbents are not regenerable and must be discarded when their absorptive capacity is exhausted. Certain regenerable $CO_2$ absorbents have also previously been proposed. Exemplary are molecular sieves and solutions of ethanol amine and other similar compounds. Although these absorbents do have the advantage of being regenerable, they also have undesirable shortcomings.

Molecular sieves absorb water vapor as well as $CO_2$. Because of the high ratio of water vapor to $CO_2$ in air, the absorptive sites of the molecular sieves become largely occupied by water rather than $CO_2$, and the $CO_2$ absorption efficiency of the sieves is reduced substantially. The use of ethanol amine solutions and the like for such absorption has also proved unsatisfactory, because the use of such solutions requires the presence of tall countercurrent scrubbing towers with associated pumps and other incidental space and weight consuming equipment. These bulky equipment requirements are particularly unsatisfactory in submarines and in small installations where fuel cells may be of particular interest.

Accordingly, to overcome the foregoing disadvantages of prior art procedures, it is a primary and general object of the present invention to provide a new and improved process and system for removing $CO_2$ from gas streams.

Another object of this invention is to provide a new and improved process and system for removing $CO_2$ from gas streams with a regenerable $CO_2$ absorber material.

A further object of this invention is to provide an improved process for removing $CO_2$ from gas streams by absorption, which process includes regeneration of the $CO_2$ absorber.

Yet another broad object of this invention is to provide an improved process and system for continuously removing $CO_2$ from gas streams.

A still further object of this invention is to provide an improved process and system for the continuous removal of $CO_2$ from a gas stream in which a continuous source of $CO_2$ absorption is provided by regeneration of a portion of the $CO_2$ absorber while the remainder of the absorber is removing $CO_2$ from the influent stream.

Another object of this invention is to provide an improved system for removing $CO_2$ from gases by absorption, which system includes improved means for regenerating the $CO_2$ absorber material.

Another object of this invention is to provide a process and system for the removal of $CO_2$ from a gas stream by absorption and for the electrochemical regeneration of the $CO_2$ absorber, which process and system utilize minimal energy in effecting the regeneration of the $CO_2$ absorber.

Another object of this invention is to provide a process and system for the removal of $CO_2$ from a gas stream by absorption and for the electrochemical regeneration of the $CO_2$ absorber, which process and system utilize energy produced during the operation of at least one fuel cell to effect the electrochemical regeneration of the $CO_2$ absorber.

Additional objects and advantages of this invention will be set forth in part in the description that follows, and in part will be obvious from the description, or may be learned by practice of the invention, the objects and advantages being realized and attained by means of the methods, processes, apparatus, and systems particularly pointed out in the appended claims.

To achieve the foregoing objects, and in accordance with its purpose, this invention provides a process for removing $CO_2$ from gas streams using a strong base such as an alkali metal hydroxide as the absorber material. The gas stream to be purified is brought into intimate contact with an aqueous solution of this strong base, and a substantial portion of the $CO_2$ in the gas stream is absorbed by the alkaline solution, and thereby removed from the stream.

The present process further provides for the regeneration of the alkali metal hydroxide absorber solution to render it capable of further $CO_2$ absorption, after its absorptive capacity has been partially or wholly exhausted. The process of this invention utilizes a fuel cell reaction and the energy generated in a fuel cell to either periodically or continuously regenerate the $CO_2$ absorber solution and render it suitable for further $CO_2$ absorption.

This regeneration is achieved by introducing the alkaline absorber solution, which contains carbonate produced by the absorption of $CO_2$, into a regenerating fuel cell as at least a portion of the fuel cell electrolyte. Hydroxyl ions are removed from a portion of the absorber solution during operation of the fuel cell, while $CO_2$ containing carbonate and bicarbonate ions remain in the solution. Concurrently with the removal of hydroxyl ions from one portion of the solution, hydroxyl ions are added to a second portion of the solution and positive alkali metal ions are transferred from the first portion to the second portion of the solution. This procedure reduces the pH of the first portion of the solution to a sufficient extent that substantial amounts of gaseous $CO_2$ are evolved from it. The second portion of the solution, because of the accumulation of hydroxyl and alkali metal ions therein, is regenerated and becomes capable of absorbing additional $CO_2$.

The present invention also provides a regenerable $CO_2$ absorber system for removing $CO_2$ from gas streams. This absorber system comprises absorbing means for passing the gas stream through a basic $CO_2$ absorber solution, preferably an alkali metal hydroxide solution, and regenerating means for periodically regenerating the $CO_2$ absorber solution after its absorptive capacity has been partially or wholly exhausted.

The regenerating means comprises at least one regenerating fuel cell having an anode and a cathode and utilizing the $CO_2$ absorber solution as at least a portion of its electrolyte, said regenerating fuel cell being provided with retaining means to retain carbonate and bicarbonate ions containing ionically bound $CO_2$ in the vicinity of its anode, and removal means to remove hydroxyl ions from the vicinity of the anode, thereby producing a sufficient reduction of the pH of the electrolyte in the vicinity of the anode to cause the evolution of $CO_2$ gas from the electrolyte in that vicinity. Hydroxyl ions are added to another portion of the solution in the vicinity of the cell cathode to render this second portion of the solution suitable for further $CO_2$ absorption.

The invention consists in the novel parts, constructions, arrangements, methods, processes, combinations and improvements shown and described.

The accompanying drawings, which are incorporated in and constitute a part of this specification, illustrate several embodiments of the invention and, together with the description, serve to explain the principles of the invention.

It is to be understood that both the foregoing general description and the following detailed description are exemplary and explanatory but are not restrictive of the invention. Reference will now be made in detail to the presently preferred embodiments of the invention, examples of which are illustrated in the accompanying drawings.

Figure 1:
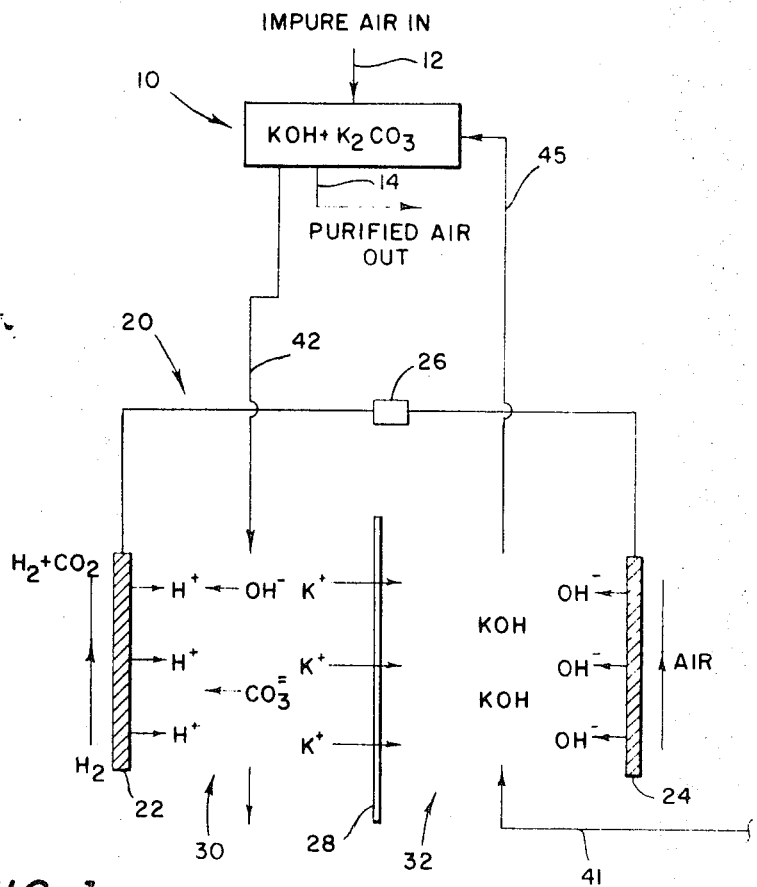
FIG. 1 is a diagrammatic representation of a regenerable $CO_2$ absorption system which is suitable for the practice of this invention. This system contains a two-compartment regenerating fuel cell.

As shown in FIG. 1, the scrubber system of this invention comprises a $CO_2$ absorber or scrubber, generally 10, and a regenerator, generally 20. Impure gas, containing $CO_2$, is passed through a suitable absorber solution in scrubber 10 prior to being used, i.e., prior its entry into a primary fuel cell, prior to being returned to the atmosphere of a submarine or a spacecraft or the like. This absorber solution removes $CO_2$ from the impure gas by absorption.

As embodied and shown in FIG. 1, impure air enters a scrubber 10 through impure air inlet line 12, and is passed through an absorber solution which comprises a mixture of potassium hydroxide (KOH) and potassium carbonate ($K_2CO_3$). This solution absorbs $CO_2$ impurities in the air by conversion of at least a portion of the KOH to additional $K_2CO_3$. The mechanism of this absorption reaction is shown by the following equation:

(I)  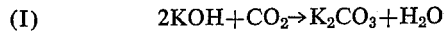

The purified air, substantially free of $CO_2$, exits scrubber 10 through conduit 14 which directs it to where it is used, i.e., to an oxidant gas chamber adjacent the oxidant electrode of a primary fuel cell, or the like.

In accordance with this invention means are provided for removing $CO_2$ from a gas stream. The absorbing means of the $CO_2$ scrubber system of this invention can comprise any suitable source of basic absorber solution, preferably an alkali metal hydroxide solution. Thus, for example, lithium hydroxide (LiOH), sodium hydroxide (NaOH), potassium hydroxide (KOH), and the like can be used. In accordance with a preferred form of this invention alkali metal carbonates are included in the absorber solution along with the alkali metal hydroxides. These combination absorber solutions have been found to be particularly well adapted to regeneration by the procedures of this invention.

Potassium hydroxide is a preferred alkali metal hydroxide scrubbing agent, and mixtures of potassium hydroxide and potassium carbonate have been found to have particularly high absorptive capacities for $CO_2$. The absorber solution is preferably richer in carbonate than in hydroxide, and can contain, for example, at least about one gram equivalent of free alkali metal ion per liter of absorber solution. Exemplary of specific absorber solutions which may be used in accordance with this invention are solutions of potassium hydroxide and potassium carbonate which contain about 1 to 2 gram equivalents of KOH per liter of absorber solution and about 5 to 6 gram equivalents of $K_2CO_3$ per liter of absorber solution. Such scrubber solutions are effective, for example, to reduce and maintain the carbon dioxide content of a non-acidic fuel cell reactant gas such as air, oxygen, or hydrogen at less than two parts per million.

In accordance with this invention, means are provided for periodically or continuously regenerating the absorber solution in the scrubber system, to render this absorber solution capable of additional $CO_2$ absorption. As embodied and shown in FIG. 1, the regenerating means comprises a regenerating fuel cell indicated generally at 20.

As shown schematically in FIG. 1, regenerating fuel cell 20 comprises anode 22 and cathode 24, which are electrically connected by external load circuit 26 which allows the passage of electrons, generated at anode 22, to cathode 24. Air or another suitable oxidant gas is supplied to cathode 24, while hydrogen or any other suitable fuel gas is supplied to anode 22 in the manner shown schematically in FIG. 1. Regenerating fuel cell 20 contains a barrier 28 spaced between anode 22 and cathode 24. Barrier 28 divides the cell into an anolyte compartment indicated generally as 30 and a catholyte compartment indicated generally as 32.

Both anode 22 and cathode 24 can be selected from conventional types of electrodes currently used in fuel cell technology. Thus, porous anodes such as catalyzed screens or sintered powder anodes are suitable as hydrogen electrode 22 of the regenerating cell, and conventional cathodes are normally suitable for use as oxygen electrode 24. The oxygen electrodes should be of a type which will function efficiently with free or circulating electrolytes, such as catalyzed biporous sintered electrodes or screen electrodes with matrices.

In compartmented regenerating fuel cells of the type shown in FIG. 1, the spent absorber solution, such as a mixture of KOH and $K_2CO_3$, is preferably supplied only to the anolyte compartment 30 of the regenerating fuel cell, as a portion of the total electrolyte of the cell. An alkali metal hydroxide solution, preferably KOH, is supplied to the catholyte compartment 32 of the regenerating fuel cell, as the remaining portion of the electrolyte, through inlet line 41.

As shown in FIG. 1, the spent absorber solution is supplied to anolyte compartment 30 of regenerating fuel cell 20 from scrubber 10 through inlet line 42. The catholyte solution, such as KOH, is supplied to catholyte compartment 32 of regenerating fuel cell 20 by any suitable means, such as from a catholyte reservoir (not shown) through conduit 41. The solutions in the anolyte and catholyte compartments electrochemically connect anode 22 with cathode 24 by providing a medium for ion flow between these electrodes.

The electrodes 22 and 24 of regenerating fuel cell 20 are electrically connected through external load circuit 26 which provides for the transfer to cathode 24 of electrons generated at anode 22. Thus, external load circuit 26 provides the cathode 24 with continuous supply of electrons necessary for the generation of hydroxyl ($OH^-$) ions at that electrode, and at the same time affords a positive power output from regenerating cell 20. This output contributes to the total power output of the overall system which includes scrubber 10, and regenerating fuel cell 20, and can also include a primary fuel cell using the purified reactant gas supplied by scrubber 10.

The scrubber system of this invention also provides means for transporting the $CO_2$-containing spent scrubber solution from scrubber 10 to anolyte compartment 30 of regenerating fuel cell 20; and means for returning the regenerated scrubber solution from catholyte compartment 32 of regenerating fuel cell 20 to scrubber 10 for further $CO_2$ absorption. These solution transport and return means are schematically indicated, respectively, by arrows 42 and 45.

In operation of the scrubber system illustrated in FIG. 1, impure air is passed through the absorber solution in scrubber 10, and then the purified air is transported to the place of its use through conduit 14.

The spent scrubber solution is periodically or continuously transported from scrubber 10 through regenerating fuel cell 20, and is returned to scrubber 10 through conduits 42 and 45, respectively. This transport is accomplished by appropriate circulating pumps (not shown). The $CO_2$ absorptive capacity of the scrubber solution is partially restored during its passage through regenerating cell 20.

In the operation of the regenerating cell, hydrogen ions and electrons are generated at anode 22, and the electrons pass through the external load circuit 26 to cathode 24. These electrons are combined with the oxygen supplied to cathode 24 and the water present in the electrolyte at the cathode surface to generate hydroxyl ions at cathode 24.

The subreactions occurring at each electrode can be summarized as follows:

ANODE REACTION (II)
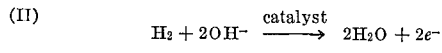

CATHODE REACTION (III)
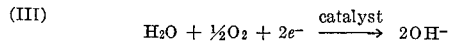

The above reactions, occurring at the cell electrodes, dictate the materials which must be used to construct the electrodes. Thus the electrode material must be one which will promote the desired reactions, and particularly the anode must be constructed of a material which does not corrode significantly under the potential and pH conditions which exist in its vicinity during the operation of the cell. Platinum-catalyzed nickel screen electrodes, and particularly platinum-catalyzed, gold-plated, nickel screen electrodes are satisfactory for use in the regenerating fuel cells of this invention.

The over-all water-forming fuel cell reaction is exothermic, and is accomplished by a release of sufficient energy to effect the reverse reaction to that which occurs in the $CO_2$ scrubber. In this reverse reaction the potassium carbonate formed during $CO_2$ absorption in the scrubber reacts with water, utilizing energy, to produce potassium hydroxide and release carbon dioxide gas. This reaction can be indicated as follows:

(IV)
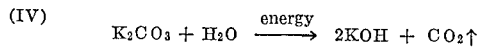

This $CO_2$ evolution occurs in the vicinity of the anode of the regenerating fuel cell and removes $CO_2$ from the absorber solution, thereby regenerating it for additional absorption.

As indicated schematically in FIG. 1, during the operation of regenerating fuel cell 20 negative hydroxyl ions are produced at cathode 24 of the cell according to Equation III while hydroxyl ions are concurrently consumed at anode 22 according to Equation II. The positive potassium ions in the electrolyte solution spontaneously migrate toward the cathode of the fell to maintain the electroneutrality of both compartments, while the negatively charged ions in the solution migrate toward the anode of the cell. The following reactions occur at the anode:

(V) 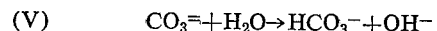

(VI) 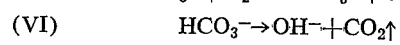

These reactions result in the evolution of $CO_2$, and hence the regeneration of the scrubber solution in the regenerating fuel cell. As $OH^-$ ions are consumed at the cell anode, both of these equations are displaced to the right, continuing the $CO_2$ evolution.

The formation of the bicarbonate ions by the reaction of Equation V, and the subsequent evolution of carbon dioxide as shown by Equation VI are a function of the pH of the anolyte solution. As operation of the cell continues, the KOH concentration in the catholyte compartment increases and a corresponding decrease occurs in the KOH concentration of the anolyte solution due to the continuous production of hydroxyl ions at the cathode, the continuous consumption of hydroxyl ions at the anode, and the continuous migration of the potassium or other alkali metal ions through barrier 28 toward the cathode of the fuel cell.

This decrease in KOH concentration near the anode causes a decrease in the pH of the anolyte (absorber) solution. When the pH of the anolyte is equal to or less than 12, the bicarbonate reaction of Equation V can take place; and when, because of further consumption of hydroxyl ions at the anode and the further potassium ion migration away from the vicinity of the anode, the pH of the anolyte solution reaches a value equal to or less than about 9, the evolution of substantial amounts of $CO_2$ occurs in accordance with the reaction of Equation VI. The pH values at which these reactions occur are determined by the state of the ionic equilibrium of the reactions.

The rate of evolution of $CO_2$ can be substantially increased by bubbling a gas through the anolyte solution when the desired pH is reached. The gas used for this purpose can be air or an inert gas, preferably nitrogen, and this gas can be passed through the solution either in the anolyte compartment or after the solution is removed from that compartment.

Each of the regenerating fuel cells used in the $CO_2$ scrubber system of this invention is provided with suitable means for the removal of the carbon dioxide evolved during regeneration. Such removal means are diagrammatically illustrated by appropriate arrows in the accompanying drawings.

Referring again to FIG. 1, barrier 28 is preferably a cation permeable membrane. Positive ions freely pass through such membranes, but the membranes are essentially impermeable to negative ions. Barrier 28 thus acts to retain negative hydroxide, carbonate and bicarbonate ions in anolyte compartment 30 but permits the steady and substantial migration of positive alkali metal ions from anolyte compartment 30 to catholyte compartment 32 of the cell.

Cation permeable membrane 28 serves an additional function in preventing the migration of hydroxyl ions generated at cathode 24 into anolyte compartment 30.

The primary function of cation permeable membranes or barrier 28 is to prevent or minimize back diffusion of KOH formed in catholyte compartment 32 into anolyte compartment 30. It can be seen from FIG. 1 that for each hydrogen ion produced at anode 22, a hydroxyl ion is produced at cathode 24. Simultaneously, there is a steady migration of $K^+$ ions through cation permeable membrane 28 toward cathode 24 (i.e., in catholyte compartment 32). Since the KOH formed in the catholyte compartment cannot pass through barrier 28, back diffusion of the potassium into the anolyte compartment is prevented. It has been found that by the use of a cation permeable membrane in a regenerating fuel cell of the type shown in FIG. 1, more than 90% of the $K^+$ ions in the anolyte solution can be transferred to the catholyte chamber of the fuel cell where they form KOH.

Referring once again to FIG. 1, as $K^+$ ions migrate from anolyte chamber 30 to catholyte chamber 32, the anolyte becomes progressively more dilute and the internal resistance of the cell increases. As this dilution of the anolyte occurs, the effectiveness of barrier 28 in preventing back diffusion of KOH into anolyte chamber 30 will also diminish because of the increasing concentration gradient across the barrier. Both of these problems of increasing internal resistance and back diffusion can be alleviated by the addition of a supporting, neutral electrolyte to the anolyte solution. Exemplary of such supporting electrolytes are potassium fluoride (KF) and potassium sulfate ($K_2SO_4$).

Figure 5:
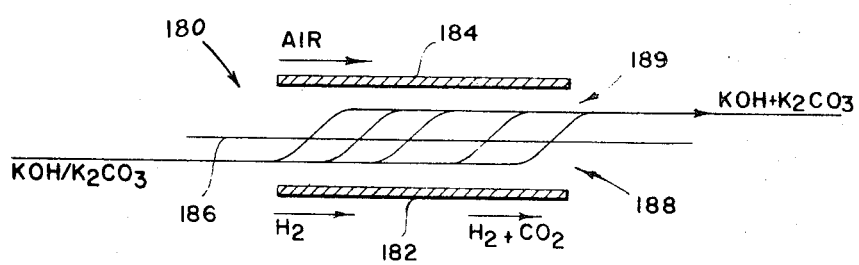
FIG. 5 is a diagrammatic representation of another embodiment of a regenerating fuel cell suitable for the continuous regeneration of $CO_2$ absorber solution in accordance with this invention.

In accordance with the present invention, the barrier used to divide the regenerating fuel cell into anolyte and catholyte compartments can be a porous diaphragm rather than an ionic membrane of the type described above. A regenerating fuel cell using such a porous diaphragm is illustrated in FIG. 5, which shows a continuous flow regenerating unit. This unit will be discussed fully hereinafter.

The porous diaphragms can be made of fuel cell grade asbestos films, porous rubber battery separators, porous nickel sheets, or Gelman W. A. Ion Exchange membranes (an extremely water permeable membrane which also has ion-exchange properties). Of course, any other suitable finely porous diaphragm can be substituted for these specifically mentioned diaphragms.

It will be appreciated from the above description that the present invention also encompasses a process for removing $CO_2$ from a gas stream. This process comprises passing the gas stream through a solution of a strongly basic material, such as an alkali metal hydroxide, to remove substantial amounts of the $CO_2$ by absorption in accordance with Equation I, above.

The absorber solution, containing absorbed $CO_2$, is periodically or continuously regenerated in accordance with the process of this invention to render it capable of further $CO_2$ absorption. This regeneration is effected by introducing the carbonate-rich absorber solution into a regenerating fuel cell as at least a portion of the fuel cell electrolyte, and removing hydroxyl ions and alkali metal ions from the absorber solution (or a portion of it) during the operation of the fuel cell, while initially retaining in the absorber solution the carbonate and bicarbonate ions containing absorbed $CO_2$. The pH of the absorber solution, or a portion of it, is thereby reduced to a sufficient extent that substantial amounts of gaseous $CO_2$ are evolved from it.

The desired $CO_2$ evolution occurs when the pH of the absorber solution is reduced to about 9 or less. Once the pH of the bulk anolyte is reduced below 9, carbon dioxide gas may bubble out of the anolyte solution as well as being evolved into the excess hydrogen stream flowing through the hydrogen gas chamber.

If the cell is operated for a sufficient period, the following situation eventually prevails:

(1) Most of the potassium originally present in anolyte chamber 30 appears as KOH in catholyte chamber 32;

(2) Most of the carbonate originally present in the anolyte has been reduced to $CO_2$ and vented from the cell;

(3) The anolyte solution has become largely deionized;

(4) The cell voltage has diminished considerably.

At this point the anolyte solution chamber can be discarded and the catholyte solution, after suitable dilution or concentration, is available for use as essentially carbonate-free KOH solution. Thus, for example, one portion of the catholyte solution may be returned to the scrubber, the remaining portion retained in the catholyte compartment for use in a subsequent regeneration cycle.

In practice, the lowest pH occurs in the electrolyte in close relationship of the catalyzed sites within the anode. The comsumption of hydroxyl ions occurs at these sites and hence the pH is lowest there, since pH is directly proportional to the logarithm of the hydroxyl ion concentration. For this reason, evolution of $CO_2$, in practice, occurs largely within anode 22.

Figure 2:
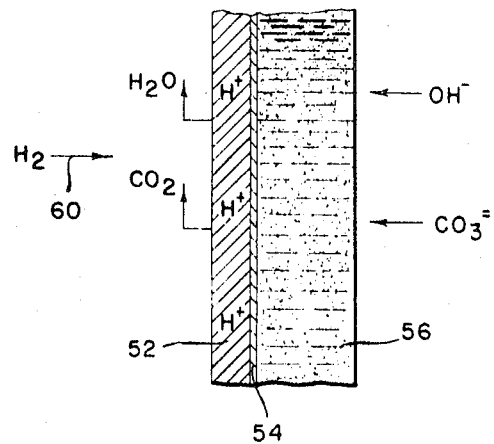
FIG. 2 is a diagrammatic representation of an expanded view of a portion of the anode of a regenerating fuel cell similar to that shown in FIG. 1 except that the cell is divided into compartments by a diaphragm directly in contact with the anode.

In a preferred embodiment of this invention, as shown in FIG. 2, the anode of the regenerating fuel cell is provided with a barrier layer, which contacts the anode of its solution side, i.e., on the side of the anode which faces the electrolyte. This barrier aids in control of the composition of the electrolyte solution in the immediate vicinity of the anode. It hinders indiscriminate mixing of the incoming bulk electrolyte with the solution in the immediate vicinity of the anode, and aids in the establishment of a smooth pH gradient in the direction of the anode.

The anode barrier layer can consist of a thin layer of any suitable porous material, such as, for example, fuel cell grade asbestos film (preferably about 30 mils thick) or an anion exchange membrane. Alternative anode barrier layers can be provided by spraying, painting, or filtering such a layer directly onto the anode surface which faces the electrolyte solution. Such layers can be made of spinel-Teflon or of a spinel-nickel mixture.

Since the region of lowest pH occurs within the pore structure of the anode, close to the gas-electrolyte interface, the use of such anode barriers in no way restricts the escape of carbon dioxide gas into the excess hydrogen gas stream exiting the regenerating fuel cell. By use of these anode barrier layers, however, it is possible to achieve improved composition control of the solution reaching the immediate vicinity of the anode of the regenerating fuel cell, and hence to increase the operating efficiency of the regenerating cell.

FIG. 2 shows a close-up view of a cell anode 52 equipped with an anode barrier layer 54 directly in contact with anode 52, on its solution side. Barrier 54 is located between anode 52 and a cell matrix 56 which contains the anolyte (absorber) solution. Matrix 56 prevents electrolyte solution from leaking into the hydrogen gas chamber and also prevents hydrogen gas from entering the electrolyte chamber. While barrier layer 54 is preferably a thin porous asbestos film, any of the alternative types of anode barrier layers described above can be substituted for such asbestos film.

It should be noted that the operation of the system of this invention can be carried out without a diaphragm of any type in some cases, particularly where the electrolyte has a low $OH^-$ concentration (i.e., less than about $10^{-3}$ moles/liter). Such operation is possible because the porous surface of the anode itself assumes somewhat the character of a barrier, controlling the composition of the electrolyte within the anode, hindering indiscriminate mixing of the solution in the anode with incoming bulk electrolyte, and aiding the establishment of a smooth pH gradient in the direction of the anode.

Operation of the regenerative cell without the use of an added barrier layer is facilitated by the use of suitable anode polarization so that the electrolyte in the gas side of the anode (surrounding the activated portion of the electrode) can be flushed away with excess fuel gas (e.g., $H_2$). The additional fuel gas necessary to flush away the $CO_2$ in such systems is compensated by the simplification of cell construction and the reduction in the internal resistance of the cell made possible by the elimination of the barrier.

Referring to FIG. 2, regardless of whether barrier 54 is an added porous diaphragm or the like or is merely the inherent barrier afforded by the porous surface of the electrode, the area of lowest pH occurs at the catalytic sites of the anode where dissolved hydrogen is ionized and hydroxyl ions consumed, and therefore the primary $CO_2$ evolution occurs within the pores of anode 52. The $CO_2$ gas there formed can be flushed from the regenerating fuel cell with excess hydrogen supplied by fuel supply means 60. The exiting fuel stream indicated schematically in FIG. 2 thus contains the $CO_2$ evolved in the regenerating cell. It also contains excess product water removed from the cell in the excess fuel gas stream. The excess $H_2$ gas in this stream can be recovered by separation from the $CO_2$ and water vapor with an appropriately selective membrane.

Removal of $CO_2$ in the excess hydrogen stream in this manner lends itself particularly well to use in regeneration of $CO_2$ scrubbers in nuclear submarines where $H_2$ gas is normally dumped into the sea. Using this system the excess $H_2$ gas could be used to remove the $CO_2$ evolved in the scrubber from the ship.

The regenerating cell shown in FIG. 1 performs a batch-type regeneration. If continuous scrubbing is to be afforded in the scrubber step of the process and system of this invention, alternate sources of scrubbing or absorbing solution must be provided in order to effectively utilize such a batch-type regeneration system. For example, referring to the regeneration system illustrated in FIG. 1, a first batch of absorber solution can be used to scrub $CO_2$ from the influent gas to the primary fuel cell until its absorptive capacity is extended. The spent absorber solution is then removed from scrubber 10 and passed to regenerating fuel cell 20 for regeneration. Meanwhile, if $CO_2$ scrubbing of the gas stream is to continue, either a second source of absorbing solution must be supplied to scrubber 10, or an alternate scrubber must be provided. Subsequently, the first batch of regenerated solution can be returned to scrubber 10 for further $CO_2$ absorption; and the spent second batch of scrubber solution can be transported to fuel cell 20 for regeneration.

It is possible to dispense with the second scrubbing chamber if the regenerating cell is designed for dual purpose operation. In such a system the influent gas to the primary fuel cell is passed directly through and brought into intimate contact with a supply of absorber solution in the regenerating fuel cell. When the absorptive capacity of this solution is expended, the influent gas is diverted to an alternative source of absorber solution, and the regenerating fuel cell is activated and operated in the manner described above to regenerate the absorber solution and render it capable to additional absorption.

It is highly desirable in accordance with this invention to provide a continuous source of $CO_2$ absorption. To achieve this result, when the above-described batch-type regenerating systems are used, it is generally desirable to provide several sources of scrubbing or absorbing solution and preferably also more than one regenerating fuel cell for alternating use.

An alternative procedure for providing continuous scrubbing, and continuous regeneration of the absorber solution can be achieved utilizing a compartmented regenerating fuel cell of the type illustrated in FIG. 1. Using this system, the influent gas to the primary fuel cell is first passed through the electrolyte in anolyte compartment 30 of the regenerating fuel cell 20 for $CO_2$ absorption, and then through the electrolyte of catholyte compartment 32 while the electrolyte in anolyte compartment 30 of that cell is being regenerated in the manner described above. When the regeneration of the anolyte solution is completed, the influent gas to the primary fuel cell is once again directed through anolyte compartment 30 for additional $CO_2$ absorption, while the catholyte solution is being regenerated.

Regeneration of the catholyte solution is accomplished by reversing the operation of the regenerating fuel cell 20, converting the original cathode 24 to an anode. By periodically reversing the operation of the cell with appropriate electrode reversal means and simultaneously diverting the flow of $CO_2$-containing influent gas through the respective chambers of regenerating fuel cell 20 with appropriate control means, this cell can provide continuous absorbing means and regenerating means for the $CO_2$ scrubber system of this invention.

Thus it can be seen that the $CO_2$ absorption of the present invention can be accomplished either in the regenerating fuel cell itself or in a scrubbing chamber which is distinct from but operatively connected with the regenerating fuel cell. For continuous scrubbing action, the $CO_2$-rich, spent absorber solution can be passed from the scrubbing chamber to the regenerator and a new or regenerated absorbing solution used in the scrubbing chamber; or two scrubbing chambers can be used alternatively; or cell operation can be periodically reversed with scrubbing carried out alternatively in each of the compartments of a compartmented regenerating cell of type illustrated in FIG. 1.

Another alternative continuous operating procedure is to feed spent scrubber solution to the anolyte compartment 30 at a slow, controlled rate to maintain the pH in that compartment at about 9. Simultaneously, KOH solution is slowly withdrawn from the cathode compartment and returned to the scrubber for further $CO_2$ absorption. The feed and withdrawal rates would be matched to maintain the solution in the scrubber at a constant volume and composition.

Figure 3:
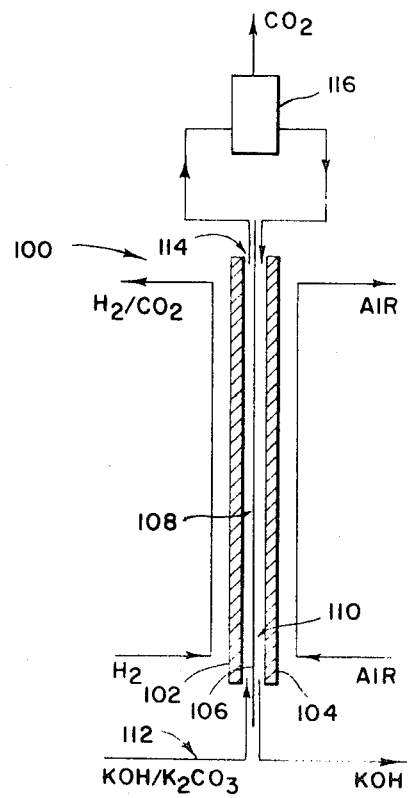
FIG. 3 is a diagrammatic representation of a two-compartment regenerating fuel cell suitable for use in the continuous regeneration of a $CO_2$ absorber material in accordance with this invention.

Additional regenerating fuel cells coming within the purview of this invention are illustrated in FIGS. 3-6. FIG. 3 illustrates diagrammatically a continuous action regenerating fuel cell, generally 100. The cell comprises an anode 102 and a cathode 104, and is provided with a barrier 106 spaced between its anode and its cathode and dividing the cell into two compartments. Barrier 106 is preferably a cation permeable membrane which acts to retain carbonate and bicarbonate ions (containing absorbed $CO_2$) in anolyte compartment 108 of the regenerating cell, and allows substantial amounts of positive alkali metal ions (such as $K^+$ ions) to pass through it and out of anolyte compartment 108 into catholyte compartment 110.

Regenerating fuel cell 100 illustrated in FIG. 3 functions chemically in the same manner as fuel cell 20, illustrated in FIG. 1. Thus, in operation of fuel cell 100, negatively charged hydroxyl ions in the anolyte compartment 108 are consumed by reaction with hydrogen at anode 102 (according to Reaction II), and positively charged potassium ions migrate from anolyte compartment 108 to catholyte compartment 110, thereby reducing the pH of the electrolyte solution in the anolyte compartment. The difference in the operation of continuous regenerating cell 100 is that spent absorber solution is continuously passed into the cell at one end of its anolyte compartment 108 by suitable transport means, such as conduit means 112, and is then continuously passed through anolyte compartment 108 to the other end of that compartment (indicated generally at 114).

In operation of the cell, as described above, hydroxyl ions are continuously consumed at anode 102 and potassuim ions continuously migrate out of anolyte compartment 108 during the passage of the solution through that compartment, so that the pH of the anolyte solution is continuously reduced during its passage through the anolyte compartment.

When the anolyte solution reaches a pH of about 9, little or no KOH remains in anolyte compartment 108, and the anolyte solution is essentially an aqueous solution of $K_2CO_3$ and $KHCO_3$. Because of the thermal disassociation of the bicarbonate radical in this solution, there is a finite pressure of $CO_2$ above the solution which increases with temperature. If the regenerating fuel cell is operated at a sufficiently high temperature, such as above about 50° C. a certain amount of $CO_2$ gas is liberated within the cell itself in the form of gas bubbles in the electrolyte.

In the regenerating fuel cell system illustrated in FIG. 3 this thermal disassociation effect is utilized to enhance the overall rate of $CO_2$ evolution from the anolyte solution. The carbonate-rich solution being regenerated is cycled from anolyte compartment 108 of regenerating cell 100 through an external heated chamber 116, where the solution is heated to a temperature above 50° C. and sparged with an inert gas stream. Although any inert gas can be used for this sparging, nitrogen is preferred. Air is also inert enough for this usage and would remove more $CO_2$ than it would add. Thus, air because of its ready availability and low cost is also a desirable sparging medium.

The system of FIG. 3 achieves highly efficient $CO_2$ removal, and by proper control of the temperature in the purging chamber and the flow rate of the inert gas, this system also efficiently removes by-product water from the anolyte solution along with the $CO_2$.

The regenerated solution leaving heating and sparging chamber 116 passes down through catholyte compartment 110 of the cell, where it receives the potassium ions that have migrated through membrane 106 from anolyte compartment 108. When the regenerated absorber solution has completed its passage through catholyte chamber 110, it is returned to the scrubber (not shown) for additional $CO_2$ absorption.

It will be readily apparent to those skilled in the art that the regenerating system illustrated in FIG. 3 can continuously receive spent absorber solution from a scrubber and simultaneously return regenerated absorber solution to the scrubber. Alternatively the continuous regeneration achieved with the system of FIG. 3 can operate in conjunction with a plurality of scrubbers, receiving spent absorber solution from one scrubber and returning regenerated solution to another.

Figure 4:
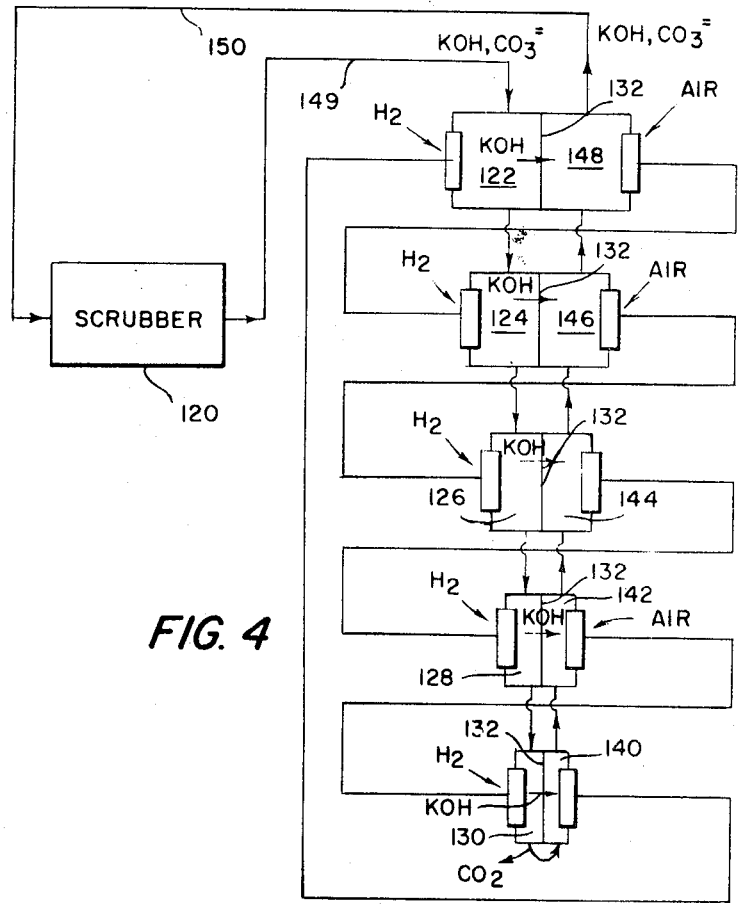
FIG. 4 is a diagrammatic representation of a cascade of two-compartment regenerating fuel cells, and is another embodiment of a regenerating system suitable for use in the continuous regeneration of a $CO_2$ absorber material in accordance with this invention.

Another embodiment of a continuous regenerating unit for the scrubber system of this invention is illustrated in FIG. 4. This regenerating system, which operates in conjunction with scrubber 120 of FIG. 4, comprises a cascade of fuel cells connected to each other in a manner suitable to provide for the flow of electrolyte from one cell to others of the cascade.

The electrolyte (which is the spent absorber solution from scrubber 120) is transported from scrubber 120 to anolyte compartment 122 of the initial cell in the cascade through inlet line 149, and then is successively transported through anolyte compartments 124, 126, 128, and 130 of the remaining cells of the cascade. The pH of the electrolyte (absorber) solution is continuously reduced during its passage through each of these anolyte compartments, because of the consumption of OH ions at the anode of each cell by combination of these ions with hydrogen ions generated at the anodes, and the simultaneous migration of potassum ions from each of these compartments through barriers 132 of each cell to compensate for the $OH^-$ ions generated at the cathodes of the cells.

The pH of the absorber solution is sufficiently reduced that $CO_2$ is evolved from anolyte compartment 130 of the last cell in the cascade. If desired, the absorber solution being regenerated can be cycled from anolyte compartment 130 through a heating and sparging chamber similar to that utilized with the regenerating fuel cell illustrated in FIG. 3. The regenerated solution is then cycled through catholyte chamber 140 of the last cell in the cascade and subsequently through catholyte chambers 142, 144, 146, and 148 of the remaining cells in the cascade.

The alkalinity of the solution is increased in its passage through each of these respective catholyte chambers by the migration of additional $K^+$ ions from the subsequently cycled absorber solution in the anolyte chambers of the respective fuel cells of the cascade. The solution exiting catholyte chamber 148 of the first cell in the cascade is a completely regenerated absorber solution which is continuously returned to scrubber 120 through conduit 150 for additional absorption.

The use of a cascade of cells of the type illustrated in FIG. 4 provides several incident benefits. The most important is the increased efficiency of operation achieved. When a single regenerating fuel cell of the type indicated in FIG. 3 is used, the internal resistance of the cell increases as regeneration proceeds. Further, the voltage developed by the cell decreases as the pH differential between the anolyte and catholyte increases. The increase in internal resistance and drop in voltage act together to reduce the cell current and thereby slow down the regeneration process.

By using a cascade of cells of the type shown in FIG. 4, connected electrically in series, the overall voltage efficiency of the system is increased. This increase in efficiency is possible because the pH of the solution in anolyte compartment 122 of the first cell in the cascade is virtually the same as the pH of catholyte chamber 148 of the first cell of the cascade (pH=14).

It will be readily apparent to those skilled in the art that the cascade can contain any desired number of fuel cells. As more cells are included in the cascade, overall performance will more nearly approach theoretical. The only limitation on the number of cells which can be included in the cascade is dictated by the added complication of the inclusion of additional cells.

The diminishing volume of the regenerating fuel cells in the cascade shown in FIG. 4 is designed to accommodate water removal from the anolyte compartment of each cell as the concentration of the electrolyte becomes more dilute because of the migration of $K^+$ ions from the anolyte compartment to the catholyte compartment of each cell. Correspondingly, as the solution advances from catholyte compartment 140 of the last cell in the cascade through the catholyte compartment of each succeeding cell, the size of that compartment is increased to allow water addition to compensate for the increasing potassium concentration of the solution resulting from such migration.

A further embodiment of a continuous action regenerating fuel cell is shown in FIG. 5. As pointed out above the regenerating cell shown here utilizes a porous film, preferably fuel cell grade asbestos or a porous nickel sinter, as a cell-dividing barrier. Referring to FIG. 5, the regenerating fuel cell, generally 180, comprises anode 182 and cathode 184 which are, respectively, supplied with suitable amounts of fuel gas such as hydrogen, and oxidant gas, such as air (shown diagrammatically in FIG. 5). Electrons formed at anode 182 are transported to cathode 184 by a suitable external load circuit (not shown). The electrodes are electrochemically connected by means of an electrolyte disposed between and in contact with them.

Regenerating fuel cell 180 contains a barrier 186 spaced between its anode 182 and its cathode 184. Barrier 186 divides the regenerating cell into an anolyte compartment, indicated generally as 188, and a catholyte compartment indicated generally as 189. This barrier, like the cation permeable membrane used as barrier 28 in FIG. 1, acts primarily to prevent back diffusion of KOH from catholyte compartment 189 to anolyte compartment 188. Barrier 186, however, is a porous diaphragm rather than a cation permeable membrane. Although the use of a regular diaphragm material is accompanied by a lower mass transfer efficiency, this, in some instances, may be more than compensated for by the higher conductivity, lower cost and higher corrosion resistance of the regular diaphragm.

In the regenerating fuel cell illustrated in FIG. 5, the spent absorber solution is passed through the cell at a sufficient rate to prevent or at least inhibit back diffusion of KOH from catholyte compartment 189 to anolyte compartment 188. Thus the steady removal of hydroxyl ions at anode 182 of the cell sufficiently reduces the pH of the expended electrolyte solution in anolyte compartment 188 to cause $CO_2$ evolution from the anolyte compartment.

Regenerating fuel cell 180 of FIG. 5 is horizontally oriented. Such orientation is preferred in cells which utilize porous diaphragm barriers to define their anolyte and catholyte compartments. The primary advantage of such horizontal orientation is that the hydrostatic pressure head over the surface of the electrodes is small and uniform in comparison to vertically disposed cells, in which the hydrostatic pressure on the electrodes faces increases from the top of the cell to the bottom.

In the operation of horizontally-oriented continuous, regenerating fuel cell 180 of FIG. 5, spent electrolyte solution from the scrubber (not shown) enters the fuel cell in anolyte compartment 188 as the cell electrolyte. As the solution passes through the cell, $OH^-$ ions are consumed at anode 182 and produced at cathode 184, the $K^+$ ions migrate through porous diaphragm 186 into catholyte compartment 189 to maintain the electroneutrality of the cell. Of course, since diaphragm 186 is not ionically selective, its purpose is only to minimize convection and diffusion mixing in the electrolyte. However, for every 100 $OH^-$ ions consumed at anode 182, 100 $OH^-$ ions are produced at cathode 184, about 50 $K^+$ ions leave the anolyte through porous diaphragm 186, and only about 50 $OH^-$ ions enter the anolyte through diaphragm 186. Because of this disproportionate transfer of $OH^-$ ions to the catholyte, a regenerated electrolyte solution of substantially reduced $CO_2$ content can be removed from catholyte compartment 189 at the downstream end of the regenerating fuel cell 180.

Figure 6:
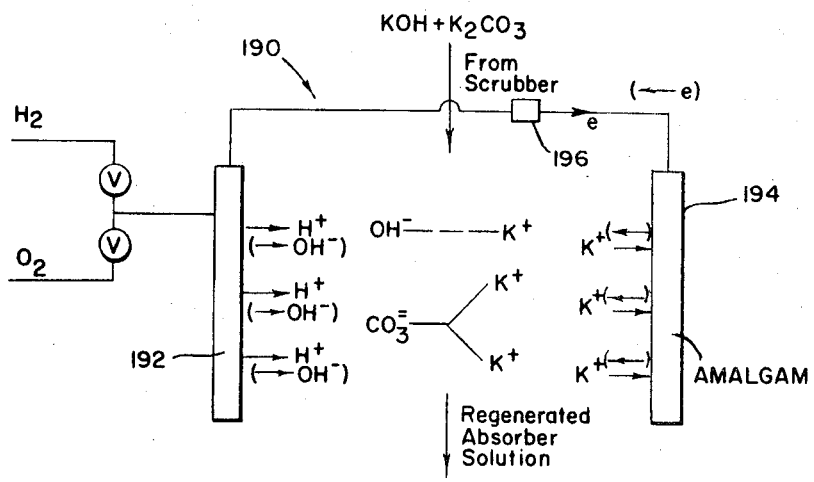
FIG. 6 is a diagrammatic representation of a single compartment regenerating fuel cell suitable for use in the $CO_2$ scrubber system of this invention.

An additional embodiment of the regenerating fuel cell used in the scrubber systems of this invention is illustrated in FIG. 6. As there shown, regenerating fuel cell 190 comprises a single chamber containing reversible electrode 192 and amalgam electrode 194. As in the regenerating fuel cells described above, the spent scrubber solution is introduced into regenerating fuel cell 190 as the cell electrolyte, and is disposed between and in contact with reversible electrode 192 and amalgam electrode 194. Electrode 192 is suitably connected to alternate sources of hydrogen and oxygen, or to alternate sources of any other suitable fuel and oxidant gases.

Electrodes 192 and 194 are connected through external load circuit 196 which allows electrons to be transferred between the electrodes of the cell.

As shown in FIG. 6, the regeneration of the electrolyte (absorber) solution is achieved by supplying hydrogen or another fuel gas to reversible electrode 192, which, operating as a standard anode, produces hydrogen ions and generates electrons which flow through external load circuit 196 to amalgam electrode 194. Amalgam electrode 194 utilizes this electrical energy to remove from the solution potassium ($K^+$) ions which are attracted to the vicinity of the negative amalgam electrode during operation of the cell. This removal of potassium ions from the bulk electrolyte solution eventually reduces its pH to about 9 or less, causing the evolution of $CO_2$ gas from the electrolyte solution, and thereby regenerating the solution and rendering it suitable for additional $CO_2$ absorption.

When the desired $CO_2$ evolution is completed, the direction of electron flow through the external load circuit is reversed, so that amalgam electrode 194 releases $K^+$ ions into the bulk electrolyte solution, thereby further increasing its alkalinity and $CO_2$ absorptive capacity. Reversible electrode 192, meanwhile, is connected to a source of oxygen gas and produces $OH^-$ ions. The reverse phase of this reaction is schematically shown in parenthetical form in FIG. 6.

By connecting two equal regenerating fuel cells of the type shown in FIG. 6 in series, and operating them in such a manner that one cell decreases the KOH content of its bulk electrolyte, thereby effecting $CO_2$ removal, while the second cell in the series increases the KOH of its bulk electrolyte, the overall amount of energy used by the regenerating cells can be kept to a minimum.

The present invention provides a new and improved process and system for scrubbing $CO_2$ from impure gas streams. The process and system of the invention provide for both the scrubbing of the $CO_2$ from such gases, and for either periodic or continuous regeneration of the scrubber solution used for this purpose.

In accordance with this invention, such regeneration is carried out using one or more regenerating fuel cells. The use of such regenerating fuel cells allows efficient scrubbing of the $CO_2$-containing gases, and practical and efficient regeneration of the scrubber solutions.

The regenerating fuel cells used in accordance wth this invention have been primarily described as operating on hydrogen and air as their reactant gases, and producing hydrogen ions ($H^+$) at the cell anode and hydroxyl ions ($OH^-$) at the cell cathode in accordance with Equations II and III above. It is to be understood, however, that any suitable fuel and oxidant gases can be used in the regenerating fuel cells utilized in accordance with this invention. Thus the regenerating fuel cells can operate on any appropriate electrode reaction, which, in addition to those described, include the following reactions at the anode and cathode, respectively:

ANODE REACTIONS (VII) 

(VIII) 

(IX) 

(If a redox system is added to the electrolyte)

CATHODE REACTIONS (X) 

(XI) 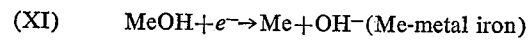

(XII) $$Ox + e^- \rightarrow Red + OH^-$$
(If a redox system is added to the electrolyte)

Any of these electrode reactions can supply and concume the $OH^-$ ions necessary for the $CO_2$ generating reactions which are produced in the regenerating fuel cell in accordance with this invention. Any pair of these electrode reactions can thus be selected to best achieve a combination of simplicity and energy economy. Generally, the lowest energy requirements are achievable with the hydrogen-oxygen fuel cell system illustrated by Equations II and III.

Certain embodiments of the regenerating fuel cells utilized in accordance with this invention, for example those illustrated in FIGS. 1 and 3–5 utilize compartmented regenerating fuel cells, which are divided into anolyte and catholyte compartments by a barrier disposed between the anode and cathode of the cell. The illustrated cells all contain only two compartments. It is to be understood, however, that additional barriers can be provided in the cell to divide it into three or more compartments, if desired.

Thus, by locating an anion permeable membrane between the cathode and anode of the fuel cell, and locating a cation permeable membrane between the anion permeable membrane and the anode, it is possible to divide the regenerating cell into three compartments, and to cause $CO_2$ evolution between the two membranes or barriers, and thereby relieve the anode of its $CO_2$ evolving duties. The location of still another barrier between the anion permeable membrane described above and the cathode of the multi-compartment fuel cell could provide a fourth compartment of a cell suitable for both $CO_2$ absorption and absorber regeneration. The raw, $CO_2$-containing air would be introduced into this fourth compartment and the scrubbed air removed from it. This fourth compartment would thus serve to prevent the stream of purified air leaving the cell from interfering with the operation of the cell cathode.

While scrubbing and regenerating fuel cells containing such additional compartments are within the contemplation of the broad process and system of this invention, it is not believed that the additional complexity introduced into the cell structure by such additional barriers is generally warranted by the increase in operating efficiency achieved by their use.

For a clearer understanding of the invention, specific examples of it are set forth below. These examples are merely illustrative and are not to be understood as limiting the scope and underlying principles of the invention in any way.

EXAMPLE 1

A fuel cell having platinum-catalyzed, wet-proofed, screen electrodes of 40 cm.$^2$ geometric surface area placed 1 cm. apart is divided into two chambers by a cation permeable membrane situated midway between the two electrodes. Hydrogen is fed to one of the electrodes (the anode) and oxygen to the other electrode (the cathode). An anolyte solution having a volume of 150 cc. and initially containing 1 g. equivalent of KOH per liter and 4 g. equivalents of $K_2CO_3$ per liter is continuously circulated at 130 cc./min. from a reservoir through the anode chamber of the cell. A catholyte solution having a volume of 2000 cc. and containing initially 1 g. equivalent of KOH per liter and 0.02 g. equivalents of $K_2CO_3$ per liter is continuously circulated at 130 cc./min. from a reservoir through the cathode chamber of the cell. The cell is operated at 50° C. with the anode and cathode connected externally through a low resistance circuit.

After 15 hours of cell operation, the total volume of the anolyte is 134 cc. which contains 0.05 g. equivalents of KOH per liter and 0.03 g. equivalents of $K_2CO_3$ per liter. The total volume of the catholyte after this period of operation is 2000 cc. containing 1.39 g. equivalents of KOH per liter and 0.025 g. equivalents of $K_2CO_3$ per liter. More than 12 g. of $CO_2$ has been evolved from the cell during the 15 hour period of operation and over 90% of this evolved $CO_2$ has been carried off by the excess hydrogen stream passing through the fuel gas chamber adjacent the anode.

EXAMPLE 2

The procedure of Example 1 is repeated using an anolyte solution which has a total volume of 150 cc. and contains 4 g. equivalents of $K_2CO_3$ per liter, and a catholyte solution which has a total volume of 1500 cc. and contains 1 g. equivalent KOH per liter. Hydrogen is fed to the anode and air to the cathode in the manner of Example 1. The pH of the anolyte solution drops from 12 to 9 over a period of 4½ hours and remains at about 9 for an additional 6½ hours.

Carbon dioxide is detected in the excess hydrogen stream leaving the anode gas chamber after one hour of operation, and the rate of $CO_2$ evolution reaches a maximum after about 5 hours of operation. After a total of 10 hours of cell operation, 40% of the $CO_2$ originally present in the anolyte solution as carbonate has been evolved from the cell and an equivalent amount of KOH has been generated in the catholyte solution.

EXAMPLE 3

The procedure of Example 2 is repeated in this example with the addition of a sparging chamber to the anolyte circulation loop. The sparging chamber is situated near the anolyte outlet from the cell and provides a slow flow of nitrogen through the anolyte solution leaving the chamber. After a total of 10 hours of cell operation, chemical analysis of the anolyte and catholyte solutions show that 79% of the $CO_2$ originally present as carbonate in the anolyte solution has been evolved from the cell. The distribution of the evolved $CO_2$ is determined by passing the excess hydrogen flow and the exit $N_2$ purge through separate soda lime tubes. The gain in weight of the soda lime tubes reveals that approximately 0.4 g. equivalents of $CO_2$ have been evolved in the excess hydrogen flow and about 0.1 equivalents of $CO_2$ have been evolved in the $N_2$ purge.

EXAMPLE 4

A fuel cell having platinum-catalyzed, wet-proofed, screen electrodes with 40 cm.$^2$ of geometric surface area is assembled with an electrode separation of 0.5 cm. The two electrodes are connected externally by a low resistance circuit. A 10 mil thick sheet of asbestos paper is placed against the anode, on its electrolyte side, and retained there by a tantalum screen. One hundred fifty (150) ml. of 7 N $K_2CO_3$ is continuously recirculated through the cell while hydrogen is fed to the anode and air to the cathode. The cell is operated at 50° C.

The hydrogen exhaust stream leaving the anode gas chamber is dried and the $CO_2$ which it contained is collected quantitatively by adsorption in soda lime tubes, which are weighed periodically. $K_2CO_3$ is progressively converted to KOH during the cell operation, with the rate of evolution of $CO_2$ diminishing as the pH of the electrolyte increases.

Typical values for the rate of $CO_2$ evolution occurring at various specific electrolyte compositions are shown in Table 1 as follows:

TABLE 1

| Composition of electrolyte, equivalents per liter | | Equivalents $CO_2$ evolved per hour per liter of cell volume |
|---|---|---|
| $K_2CO_3$ | KOH | |
| 6.5 | 0.5 | 2.1 |
| 6.0 | 1.0 | 1.6 |
| 5.5 | 1.5 | 1.0 |
| 5.0 | 2.0 | 0.5 |

EXAMPLE 5

The procedure of Example 4 is repeated with an additional 20 mil. layer of asbestos paper attached to the electrolyte side of an anode. The rates of $CO_2$ evolution corresponding to specific electrolyte compositions are shown in Table 2.

TABLE 2

| Composition of electrolyte, equivalents per liter | | Equivalents $CO_2$ evolved per hour per liter of cell volume |
|---|---|---|
| $K_2CO_3$ | KOH | |
| 6.5 | 0.5 | 1.9 |
| 6.0 | 1.0 | 1.7 |
| 5.5 | 1.5 | 1.5 |
| 5.0 | 2.0 | 1.3 |
| 4.5 | 2.5 | 1.1 |

This invention in its broader aspects is not limited to the specific details shown and described, but departures may be made from such details within the scope of the accompanying claims without departing from the principles of the invention and without sacrificing its chief advantages.

What is claimed is:

1. A fuel cell and scrubber system for removing $CO_2$ from a gas stream and generating an electric potential, said system comprising:
   (a) absorbing means for passing a $CO_2$-containing gas stream through a $CO_2$ absorber solution of alkali metal hydroxide;
   (b) means for conveying the spent alkali metal hydroxide absorber solution to regenerating means for regeneration of said solution to render it capable of additional $CO_2$ absorption;
   (c) regenerating means for periodically regenerating the $CO_2$ absorber solution, said regenerating means comprising at least one regenerating fuel cell having an anode and a cathode and utilizing the $CO_2$ absorber solution as at least a portion of its electrolyte, said regenerating fuel cell being provided with retaining means to retain carbonate and bicarbonate ions containing ionically bound $CO_2$ in the vicinity of its anode, and with a load circuit connecting the anode and the cathode of the fuel cell, said circuit transmitting electrons from the anode to the cathode of the regenerating cell and transmitting a positive power output from the regenerating cell to an external load; said regenerating cell operating to produce a sufficient reduction of the pH of the electrolyte in the vicinity of said anode to cause the evolution of $CO_2$ gas from the electrolyte in said vicinity.

2. The system of claim 1, in which said regenerating fuel cell contains a barrier between its anode and its cathode, said barrier dividing the cell into an anolyte compartment containing the anode and a catholyte compartment containing the cathode, said barrier acting to retain the carbonate and bicarbonate ions in said anolyte compartment, acting to retain hydroxyl ions formed at the cathode in the catholyte compartment, and allowing substantial amounts of the positive alkali metal ions to pass through it into the catholyte compartment.

3. The system of claim 2, in which the barrier is a cation permeable membrane.

4. The system of claim 2, in which the barrier is a porous diaphragm.

5. The system of claim 1, in which the retaining means of (c) is a porous diaphragm which is directly in contact with the anode on its electrolyte side.

6. The system of claim 5, in which the porous diaphragm is an asbestos sheet.

7. The system of claim 4, in which the regenerating fuel cell is horizontally oriented with the cathode disposed above the anode.

8. The system of claim 7, which includes transport means to continuously introduce spent absorber to be regenerated into the anolyte compartment of said regenerating fuel cell, and removal means to continuously remove regenerated absorber solution from the catholyte compartment of said regenerating fuel cell.

9. The system of claim 2, in which the regenerating fuel cell comprises both said absorbing means and said regenerating means; said regenerating cell containing the absorber solution and being provided with means to pass the gas to be scrubbed through that solution.

10. The system of claim 9, in which at least two absorbing and regenerating cells are run in combination so that at least one cell is absorbing $CO_2$ from the influent stream while at least one other cell is regenerating its absorber solution, said system having alternating means for periodically diverting the supply of influent gas from one cell to the other to allow regeneration of the cell which was previously absorbing $CO_2$, thereby providing continuous $CO_2$ absorption from the influent gas stream.

11. The system of claim 2, in which the regenerating fuel cell comprises both the absorbing means and the regenerating means; both the anolyte compartment and the catholyte compartment of said regenerating cell being provided with influent gas transport means to pass the influent gas to be scrubbed through a scrubber solution in said compartments; said regenerating cell having electrode reversal means to periodically reverse the operation of each electrode of the cell so that the electrode previously operating as the anode becomes the cell cathode and the electrode previously operating as the cathode becomes the cell anode, and influent gas control means to direct the influent gas stream alternately to each compartment of the cell during the period the electrode in that compartment acts as the cell cathode.

12. The system of claim 2, which provides for continuous regeneration of said absorber solution, said regenerating fuel cell containing transport means for continuously flowing spent absorber solution through the anolyte compartment of said cell and then from said anolyte compartment in the opposite direction through the catholyte compartment of said cell; the anolyte compartment of said cell having a sufficient length that the removal of hydroxyl ions from the absorber solution during its passage through the anolyte compartment reduces the pH of the absorber solution exiting said anolyte compartment to at least about 9, whereby $CO_2$ gas is evolved from the absorber solution prior to its entry into said catholyte compartment.

13. The system of claim 12, which includes an external heating and sparging chamber associated with said regenerating fuel cell, the transport means passing the absorber solution exiting said anolyte compartment through said chamber prior to its entry into said catholyte compartment; said chamber containing heating means for heating said absorber solution to at least about 50° C. and sparging means for sparging the absorber solution with an inert gas.

14. The system of claim 1, in which the regenerating means comprises at least one regenerating fuel cell containing spent absorber solution as its electrolyte, said regenerating fuel cell having one reversible electrode than can operate either as the cell anode or as the cell cathode, and a second electrode constructed of amalgam which absorbs positive alkali metal ions from said absorber solution when it is operated as the cell cathode and redischarges these alkali metal ions into the electrolyte solution when it is operated as the cell anode.

15. The system of claim 14, in which two of the regenerating fuel cells are connected in series so that the amalgam electrode of one of said regenerating cells is absorbing positive alkali metal ions while the amalgam electrode of the other regenerating cell is discharging such ions, said cells having reversal means to periodically reverse the operation of each cell to cause the previously discharging amalgam electrode to absorb the alkali metal ions and the previously absorbing amalgam electrode to discharge such ions.

16. The system of claim 1, in which the porous surface of the anode facing the electrolyte acts as the retaining means.

17. The system of claim 16 in which the anode is sufficiently polarized that $CO_2$ gas is evolved from the electrolyte solution at and near the gas-electrolyte interface within said anode, which solution has a pH not greater than about 9; said fuel cell being provided with excess fuel gas generation means to supply sufficient excess fuel gas to said anode to flush away the evolved $CO_2$ with the excess fuel gas stream.

18. The system of claim 17, which is provided with separating means for separating the evolved $CO_2$ from the excess fuel gas after the $CO_2$-fuel gas mixture is removed from the fuel cell.

19. The system of claim 1, in which the regenerating means comprises a plurality of regenerating fuel cells operated in series, each of said cells having an anode and a cathode and being divided into an anolyte compartment containing said anode and a catholyte compartment containing said cathode by a barrier spaced between said anode and said cathode; said barriers retaining carbonate and bicarbonate ions containing the absorbed $CO_2$ within said anolyte compartments, retaining hydroxyl ions formed at the cathode of each of said cells within said catholyte compartments, and allowing substantial amounts of the positive alkali metal ions in said anolyte compartments to pass out of the anolyte compartment of each of said cells and into the catholyte compartment of the same cell; said series of cells being operably connected by electrolyte transport means which transport the electrolyte containing absorbed $CO_2$ from the anolyte compartment of the first cell in said series to and through anolyte compartment of second cell in said series and then to and through the anolyte compartment of each successive cell in said series, the pH of the electrolyte in the anolyte compartment of the last cell in said series being reduced to a value not greater than about 9 by the consumption of hydroxyl ions at the anode of each of said cells and the removal of alkali metal ions in the passage of the electrolyte through the anolyte compartment of each successive cell, whereby $CO_2$ gas is evolved from the electrolyte in anolyte compartment of said last cell; said transport means further transporting the electrolyte solution exiting the anolyte compartment of the last cell in said series to and through the catholyte compartment of said last cell, and then in turn to and through the catholyte compartment of each successive cell in said series, the pH of said electrolyte being increased on its passage through each successive catholyte compartment by the hydroxyl ions generated at the cathode of each of said cells and by the alkali metal ions being passed to each catholyte compartment from the anolyte compartment of the same cell, so that the electrolyte exiting the catholyte compartment of the first cell in said series comprises a regenerated scrubber solution having substantially the same pH but a substantially lesser absorbed $CO_2$ content than the carbonate-rich scrubber solution entering the anolyte compartment of said first cell; the last cell in said series being equipped with $CO_2$ removal means to remove from said cell the gaseous $CO_2$ evolved from the electrolyte in the anolyte compartment of said last cell.

20. The system of claim 19, in which the volume of the anolyte compartment of each succesive cell in said series is reduced, and the volume of the catholyte compartment of each successive cell from the last cell to the first cell is increased, each of said anolyte compartments being provided with water removal means to remove water from said electrolyte as its ion content is diluted in its passage through said successive anolyte compartments, and each of said catholyte compartments being provided with water addition means to add water to the electrolyte as its ion concentration is increased in its passage through each of said successive catholyte compartments.

References Cited

UNITED STATES PATENTS

| 2,777,811 | 1/1957 | McRae et al. | 204—257 X |
| 2,793,182 | 5/1957 | Visnapuu | 204—257 X |
| 2,827,426 | 3/1958 | Bodamer | 204—98 |
| 2,860,095 | 11/1958 | Katz et al. | 204—301 X |
| 3,124,520 | 3/1964 | Juda | 204—98 X |
| 3,262,868 | 7/1966 | Juda | 204—98 |
| 3,344,050 | 9/1967 | Mayland et al. | 23—4 X |

ALLEN B. CURTIS, Primary Examiner

U.S. Cl. X.R.

23—4; 204—103, 153, 257

PO-1050
(5/69)

UNITED STATES PATENT OFFICE
CERTIFICATE OF CORRECTION

Patent No. 3,519,488          Dated July 7, 1970

Inventor(s) Jose Giner

It is certified that error appears in the above-identified patent and that said Letters Patent are hereby corrected as shown below:

Column 1, line 25, "0" should be -- 9 --.

Claim 14, column 18, line 60, "than" should be -- that --.

SIGNED AND
SEALED

SEP 29 1970

(SEAL)
Attest:

Edward M. Fletcher, Jr.
Attesting Officer

WILLIAM E. SCHUYLER, JR.
Commissioner of Patents